United States Patent
Gotzen et al.

(10) Patent No.: US 12,219,894 B2
(45) Date of Patent: Feb. 11, 2025

(54) METERING DEVICE FOR AN AGRICULTURAL MACHINE

(71) Applicant: LEMKEN GmbH & Co. KG, Alpen (DE)

(72) Inventors: Christian Gotzen, Viersen (DE); Dennis Bergerfurth, Rees (DE); Bernd Valtwies, Stadtlohn (DE)

(73) Assignee: LEMKEN GmbH & Co. KG, Alpen (DE)

( * ) Notice: Subject to any disclaimer, the term of this patent is extended or adjusted under 35 U.S.C. 154(b) by 231 days.

(21) Appl. No.: 17/922,418

(22) PCT Filed: May 7, 2021

(86) PCT No.: PCT/DE2021/100420
§ 371 (c)(1),
(2) Date: Oct. 31, 2022

(87) PCT Pub. No.: WO2021/223817
PCT Pub. Date: Nov. 11, 2021

(65) Prior Publication Data
US 2023/0189695 A1  Jun. 22, 2023

(30) Foreign Application Priority Data
May 8, 2020 (DE) ............... 10 2020 002 762.8

(51) Int. Cl.
*A01C 7/04* (2006.01)
*A01C 7/08* (2006.01)

(52) U.S. Cl.
CPC ............ *A01C 7/042* (2013.01); *A01C 7/081* (2013.01)

(58) Field of Classification Search
None
See application file for complete search history.

(56) References Cited

U.S. PATENT DOCUMENTS 4,465,016 A * 8/1984 Weber ............... G01F 11/20
    118/303
4,705,220 A * 11/1987 Gandrud ............ A01C 7/123
    239/654
4,779,765 A * 10/1988 Neumeyer ........... A01C 7/06
    111/178

(Continued)

FOREIGN PATENT DOCUMENTS

CN     202960338 U     6/2013
DE     102013110991     11/2014
(Continued)

OTHER PUBLICATIONS

Christian Gotzen et al., co-pending U.S. Appl. No. 17/922,432, national phase entry of PCT/DE2021/100421.

*Primary Examiner* — Joseph A Dillon, Jr.
(74) *Attorney, Agent, or Firm* — Smartpat PLC (57) ABSTRACT

A metering device for an agricultural machine for outputting granular solids out of at least one storage container to at least one dispensing unit by means of, in particular, a pneumatic conveyor system, has a metering housing. The metering housing comprises at least one mounting flange on the storage container-side and/or conveyor system-side as well as at least one inflow opening and at least one discharge opening for the granular solid. The at least one mounting flange is formed as polygon or circular.

13 Claims, 5 Drawing Sheets

(56) References Cited

U.S. PATENT DOCUMENTS

| | | | | |
|---|---|---|---|---|
| 4,928,858 | A * | 5/1990 | Tite | A01C 15/16 |
| | | | | 222/312 |
| 5,024,356 | A | 6/1991 | Gerling et al. | |
| 7,765,943 | B2 * | 8/2010 | Landphair | A01C 7/124 |
| | | | | 111/178 |
| 8,132,521 | B2 | 3/2012 | Snipes et al. | |
| 9,144,190 | B2 | 9/2015 | Henry et al. | |
| 9,510,501 | B2 * | 12/2016 | Gebbeken | A01C 7/102 |
| 9,615,505 | B2 * | 4/2017 | Bent | A01C 7/084 |
| 9,801,330 | B2 | 10/2017 | Bent et al. | |
| 10,485,158 | B2 * | 11/2019 | Roberge | A01C 7/127 |
| 10,820,487 | B2 * | 11/2020 | Roberge | A01C 7/127 |
| 10,842,073 | B2 * | 11/2020 | Garner | A01C 7/201 |
| 10,932,408 | B2 * | 3/2021 | Chini | A01C 7/124 |
| 11,662,238 | B2 * | 5/2023 | Schumacher | A01C 7/125 |
| | | | | 222/71 |
| 11,723,300 | B2 * | 8/2023 | Harmon | A01C 7/081 |
| | | | | 111/11 |
| 11,980,122 | B2 * | 5/2024 | Thompson | A01C 7/082 |
| 2005/0263052 | A1 | 12/2005 | Pleyer | |
| 2010/0307395 | A1 | 12/2010 | Snipes | |
| 2016/0234998 | A1 | 8/2016 | Gebbeken et al. | |
| 2016/0242353 | A1 * | 8/2016 | Bent | B65G 53/4608 |
| 2018/0352726 | A1 * | 12/2018 | Chini | A01C 17/003 |
| 2019/0297773 | A1 | 10/2019 | Assy et al. | |
| 2020/0217703 | A1 * | 7/2020 | Schumacher | A01C 7/125 |
| 2021/0235613 | A1 * | 8/2021 | Pederson | A01C 7/081 |
| 2023/0189695 | A1 * | 6/2023 | Gotzen | A01C 7/123 |
| | | | | 111/174 |
| 2023/0189699 | A1 * | 6/2023 | do Amaral Assy | A01C 7/128 |
| | | | | 111/183 |
| 2023/0345862 | A1 * | 11/2023 | Gotzen | A01C 7/102 |
| 2023/0413722 | A1 * | 12/2023 | Plattner | G01F 13/005 |

FOREIGN PATENT DOCUMENTS

| | | |
|---|---|---|
| DE | 102018006660 A1 | 2/2020 |
| EP | 1570716 B1 | 7/2008 |
| EP | 2152615 A1 | 12/2008 |
| EP | 2210465 A1 | 7/2010 |
| EP | 2314142 A1 | 4/2011 |
| EP | 2862431 B1 | 1/2016 |
| EP | 3008988 A1 | 4/2016 |
| EP | 3384748 A1 | 10/2018 |
| EP | 3384748 B1 | 9/2022 |
| RU | 2461171 C2 | 9/2012 |

* cited by examiner

METERING DEVICE FOR AN AGRICULTURAL MACHINE

TECHNICAL FIELD

The present invention relates to a metering device for an agricultural machine for outputting granular solids.

BACKGROUND

Granular solids, for example in the form of seeds or fertilizer, are usually transported from a storage container to one or more dispensing units by means of a conveyer system. For this purpose, mechanical conveyer systems or frequently also pneumatic conveyer systems are employed, which convey the granular solid by means of a blower via connecting lines from the storage container, for example by way of a distribution device and a plurality of lines connected there, to the respective dispensing units. Feeding the granular solid from the storage container into the conveyer system is controlled by means of a metering device.

From EP 1570716 A2 a generic agricultural machine having a metering device for distributing a granular solid is known. This machine for distributing a granular solid comprises a metering device having one or more exchangeable cellular wheels. The cellular wheels are arranged in a housing. Following the removal of a bearing plate from a lateral opening, the respective cellular wheel arranged in the housing can be removed from the housing in the axial direction. A metering of the solid to be output takes place merely by way of the cellular wheel, wherein a change of the quantity to be output is merely possible by way of the rotary speed of the cellular wheels and by using different cellular wheels, for the purpose of which however an interruption of the work in process and an expensive removal of the installed cellular wheel and subsequent mounting of a new cellular wheel is required each time.

SUMMARY

It is an object of the present disclosure to provide a metering device for an agricultural machine which makes possible a cost-effective production, an improved adjusting possibility and mounting of the metering device.

The object is solved through a metering device according to the features of independent claim. Advantageous embodiments of the invention are stated in the subclaims.

A metering device for an agricultural machine for outputting granular solids out of at least one storage container to at least one dispensing unit by means of, in particular a pneumatic conveyor system, includes a metering housing, wherein the metering housing comprises at least one mounting flange on the storage container-side and/or the conveyor system-side and at least one inflow opening and at least one discharge opening for the granular solid. The at least one mounting flange is formed as a polygon or circular.

The metering housing is at least connected via a mounting flange to the storage container and the conveyor system, in particular to a connecting line of the conveyor system. The mounting flange in the form of a polygon can comprise three or more than four corners along its circumference. The corners can be arranged evenly or unevenly along the circumference of the mounting flange. This makes it possible to mount the metering housing turned in steps, as a result of which the existing installation space can be advantageously utilised.

For example, adjacent metering devices can be placed turned relative to one another and thus laterally more closely next to one another, as a result of which the required installation space for each metering device in the lateral direction can be reduced. By way of a mounting flange of circular design, a continuous orientation of the metering housing relative to a storage container or conveyor system, for example, connecting lines, can take place. This has the advantage that the existing installation space can be even better utilised.

In a preferred configuration, the at least one inflow opening and/or the at least one discharge opening are arranged within a mounting flange. An inflow opening and/or discharge opening can be arranged within or outside the mounting flange. It is conceivable that multiple openings can be arranged within or at least partially within the mounting flanges, as a result of which a high flexibility in the utilisation available installation space is made possible. Here, the mounting flange encloses the respective opening or openings on the outside. Because of this, the mounting flange can have a large diameter as a result of which a stable and reliable mounting of the metering device can be made possible.

In a particularly preferred configuration, a second mounting flange located opposite the first mounting flange is provided, which is formed as a polygon or circular. By way of a second mounting flange, a mounting flange each can be arranged both on the storage container-side and also on the conveyor system-side, as a result of which an optimal orientation of the metering device and/or of the conveyor system, for example relative to the storage container can be made possible. The second mounting flange in the form of a polygon can comprise two or more than four corners along its circumference. The corners can be evenly or unevenly arranged along the circumference of the mounting flange. This makes possible to mount the metering housing turned in steps, as a result of which the existing installation space can be advantageously utilised.

In a further configuration, the mounting flange is designed in such a manner that the same can be mounted by way of a fastening means which in particular wraps around the mounting flange. The mounting flange can form for example, in particular a circumferential projection extending radially to the outside. This projection can be formed at least partially by the metering housing, the storage container and/or the conveyor system. The fastening means can partially or completely enclose this projection along its circumference and be configured releasably. A fastening means can have the form of a clip, which can be arranged along the circumference, or, in particular an angular or polygonal clamp. The mounting flange, the projection and/or the fastening means can be configured in the form of a conical flange and/or a conical clamp, as a result of which a self-sintering and/or clamping during the mounting can be achieved, as a result of which the same can be simplified.

In a particularly preferred configuration, the fastening means is designed in the form of a quick clamping closure. A quick clamping closure can be at least partially matched to the shape profile of the mounting flange and configured in the form of a quick clamping clip or a quick-release clamp.

In a particularly preferred configuration, the metering housing forms a metering chamber on the inside, wherein between metering chamber and the conveyor system a conveyor device rotating about a rotary axis is arranged, wherein the conveyor device separates the at least one inflow opening and the at least one discharge opening, in particular in a pressure-tight manner. The metering chamber comprises, in particular on the bottom side a chamber opening which directly adjoins the conveyor device mounted in the metering housing, and through which the granular solid can enter the conveyor device by means of conveyor elements. A cross-section of the chamber opening that is effective for the inflow of the granular solid into the conveyor device can be adjusted by a rotary slide valve, in particular an opening of the rotary slide valve. By way of this, a quantity of granular solid flowing into the conveyor device can be adjusted. By way of the rotating conveyor device, the quantity of granular solid, which is to be introduced into the conveyor system, can be metered dependent on rotation. A pressure-type configuration is an advantage particularly in the case of a pneumatic conveyor system in order to separate in terms of pressure a storage container-side region and a conveyor system-side region and avoid mutual influencing.

In a further particularly preferred configuration, the metering housing is formed in multiple parts. Preferentially, the metering housing is formed out of two mirrored or identically shaped sub-bodies. By way of a multi-part housing, production and mounting can be optimised. In particular in the case of a metering housing which is constructed of multiple, for example a first and a second, sub-bodies, costs in the production can be reduced by identical parts, i.e. mirrored or identically shaped sub-bodies. In addition, adjustments to the function expansion can be easily carried out on the metering housing by replacing a sub-body.

In a further preferred configuration, a separating plane of the sub-bodies of the metering housing is substantially arranged at an angle to the rotary axis. The separating plane, which is arranged in a contact surface between the sub-bodies, can be arranged for example substantially parallel or at a right angle to the rotary axis. Also conceivable is any other angle based on the rotary axis, for example substantially 30° or 45°. Through suitable arrangement of the separating plane, for example substantially parallel or at a right angle to the rotary axis, wherein the separating plane runs in particular centrally through the thread arranged on the metering housing, the sub-bodies can be produced for example as components, in particular as injection-moulded components or shaped parts, which can be produced with moulds of simple design with few slides or undercuts or free of slides or undercuts in a cost-effective manner. In addition, the components could be configured with demoulding bevels, as a result of which fewer or no ejectors from the moulds would be needed, as a result of which the production costs could be lowered further.

According to a further configuration, the metering housing comprises at least one drain opening, which is arranged in particular in the separating plane of the sub-bodies of the metering housing. The at least one drain opening can be arranged between the conveyor device and the inflow opening and can thus connect the interior of the metering housing for example with the surroundings in order to make possible a simplified emptying of the metering housing by draining the granular or powdery solid through the drain opening. The drain opening can protrude out of the metering housing and comprise a thread or other positive connection element for receiving a drain plug as closure. The thread can be formed for example as an external thread or internal thread. The drain opening can be arranged in the separating plane of the sub-bodies of the metering housing, wherein the thread can be arranged in equal parts in separating planes, as a result of which the same can also be moulded cost-effectively during the production.

In a further preferred configuration of the metering device, the metering housing forms a metering chamber and at least one, in particular detachable, separating element is arranged within the metering chamber. The metering chamber can be arranged between the inflow opening and the conveyor device in order to feed the solid to the conveyor device. The separating element can separate the metering chamber into two regions, into which different solids can be introduced and fed to the conveyor device. By way of slide valve or limiting elements, in particular by a rotary slide valve, solid can be fed to the conveyor device each for example out of a first sub-chamber and/or a second sub-chamber in the case of a separated metering chamber, wherein depending on the orientation of the separating element conveying of the solids can take place with all or a part of the metering elements. The separating element can be mounted in the sub-bodies of the metering housing and be arranged substantially parallel or at, in particular, a right angle to the rotary axis. The separating element can be formed in one piece or multiple parts, in particular each be moulded on proportionally in a sub-body. By way of the separating element, one or more solids can be fed to the conveyor device without a time-consuming conversion or cleaning of the metering device being required.

In a further configuration, the metering housing comprises, on the conveyor system-side of the conveyor device, a further discharge opening and/or a bypass opening. The further discharge opening can be arranged between the conveyor device and the conveyor system in order to make possible for example connecting the metering device to a further connecting line. By way of this, a granular solid can be metered into a further connecting line or a second granular solid into a separate connecting line. The bypass opening can be arranged and formed in the metering housing, in particular on the conveyor device in such a manner that a granular solid is conveyed by the conveyor device out of the metering housing without entering the conveyor system in the process. The bypass opening can be led out of the metering housing, in particular through a mounting flange, into the surroundings. By way of the bypass opening, a calibration test for calibrating the metered quantity of granular solid can be conducted for example. In addition, emptying of the metering device can be made possible without granular solid entering the conveyor system. The first discharge opening, the further discharge opening and/or the bypass opening can be opened or closed by a slide valve, in particular a rotary slide valve.

In a preferred configuration, a separating device is provided on the conveyor system-side of the conveyor device. The separating device can be arranged, in particular on the conveyor system side, on the conveyor device between discharge openings and makes possible a separate metering of granular solids. The separating device can be designed as a flat element and arranged within at least one connecting line, wherein the separating device can reach as far as up to the conveyor device. By way of the separating device, a separation of the at least one discharge opening and/or bypass opening can take place in order to make possible a trouble-free conveying of the solids. The separating device can be arranged within a connecting line in order to form separate conveying paths.

In a further preferred configuration, at least one driveable agitator shaft is arranged within the metering chamber, in particular on the storage container-side. The agitator shaft can rotate about an agitation axis in order to loosen up the solid in the metering chamber and improve the metering. The agitator shaft can be arranged parallel to the rotary axis and in particular be mounted in a sub-body of the metering housing each. Preferably, the agitator shaft is jointly driven with the conveyor device or the metering elements, in particular by way of a belt, chain or gear reduction. A reduction gear makes possible adjusting a transmission ratio between metering element and agitator shaft in order to positively influence the agitation intensity.

Further, the disclosure relates to an agricultural machine for outputting granular solids having, in particular, a pneumatic conveyor system for conveying the granular solids out of a storage container to a number of dispensing units with at least one metering device, which is formed and further developed as above.

In a preferred configuration of the agricultural machine, the at least one metering device is assigned one or more dispensing units and/or distribution devices. These can be designed for example in the form of coulters or so-called star distributors.

In the following, the invention is explained in more detail by way of exemplary embodiments.

DETAILED DESCRIPTION

Figure 1:
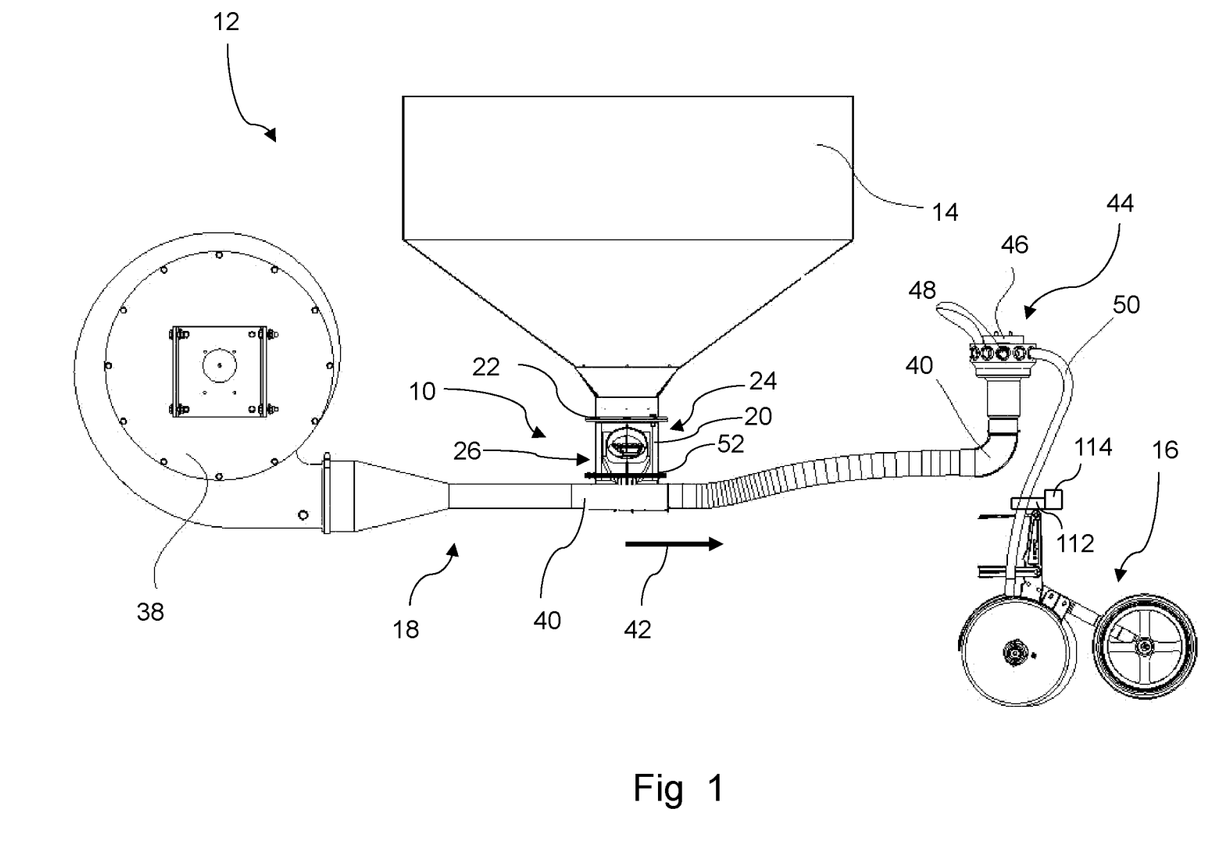
FIG. 1 shows an agricultural machine having a metering device in a schematic lateral view.

In FIG. 1, an agricultural machine 12 in the form of a seeding machine is shown in a schematic lateral view. At least one granular or powdery solid, for example in the form of seeds and/or fertilizer, is situated in a storage container 14. The granular solid is conveyed to at least one dispensing unit 16 by means of a mechanical or pneumatic conveyor system 18, where the granular solid can be introduced into the ground for example by coulters. The conveyor system 18 shown in FIG. 1 is a pneumatic conveyor system 18, in which the granular solid is conveyed in the conveying direction 42 through a connecting line 40 to at least one dispensing unit 16 by means of an air stream generated by a blower 38. For this purpose, the granular solid is conducted through a connecting line 40 to at least one distribution device 44, in which in a distribution chamber 46 a substantially uniform distribution of the granular solid over a number of slide valve openings 48 and lines 50 connected thereon takes place. The granular solid is conducted further through the lines 50 as far as the dispensing units 16. The dispensing units 16 can be for example seed coulters. The granular solid can be moved by the air stream with flow velocities of up to 30 m/s.

The granular solid is conveyed out of the storage container 14 into the conveyor system 18 by means of a metering device 10, wherein an accurate metering of the quantity of the conveyed solid takes place. The metering device 10 is arranged between the storage container 14 and the conveyor system 18, wherein in the agricultural machine 12 shown in FIG. 1 the granular solid is fed out of the storage container 14 to the metering device 10 substantially by gravity. For the supply of the granular solid, the metering device 10 comprises a metering housing 20 having at least one storage container-side inflow opening 24. The metered granular solid is dispensed into the conveyor system 18 through at least one discharge opening 26 arranged in the metering housing 20 on the conveyor system-side. For fastening to the storage container 14 and/or the conveyor system 18 on the storage container-side and/or conveyor system-side, the metering housing 20 comprises mounting flanges 22, 52.

The first mounting flange 22 on the storage container-side and the second mounting flange 52 on the conveyor system-side are of circular design. A configuration in the form of a polygon, in particular, having three or more than four corners would likewise be conceivable. By way of this, the metering device 10, based on the storage container 14 and/or the conveyor system 18, can be arranged turned in particular in steps or continuously. For regulating an output quantity of the metering device 10, the agricultural machine 12 comprises at least one sensor 112 connected to an electronic evaluation system 114 on the output unit-side of the metering device 10, by way of which a metered quantity of the granular solid can be detected and in particular the conveyor device 32 controlled based on the detected quantity of the granular solid.

Figure 2:
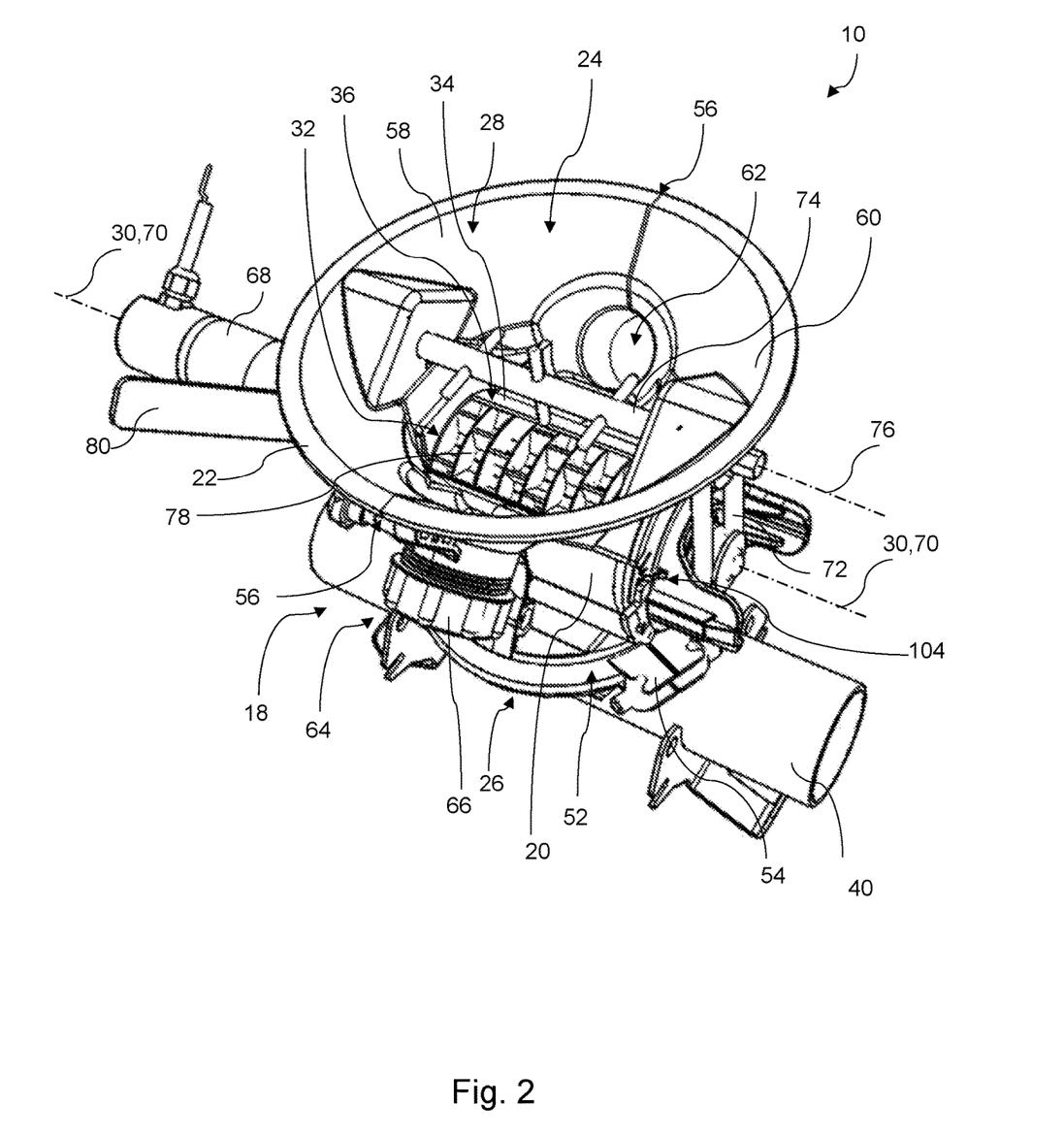
FIG. 2 shows a perspective schematic view of a metering device.

A perspective, schematic view of a metering device 10 is shown in FIG. 2. On its top side, the metering device 10 is shown to be not connected to the storage container, offering a view through the inflow opening 24 into the interior of the metering housing 20 and the metering chamber 28 formed by the said metering housing 20 on the inside. The inflow opening 24 is arranged within the circular first mounting flange 22 of the metering housing 20 and is enclosed by the same. On the bottom side, the metering housing 20 comprises the second mounting flange 52, which is likewise circular in design. The second mounting flange 52 encloses the first discharge opening 26 arranged within, through which the granular solid enters the conveyor system 18 and the connecting line 40. The second mounting flange 52 is detachably connected to the conveyor system 18 by way of a fastening means 54 in the form of a quick-release closure which wraps around the mounting flange 52.

On the metering chamber-side, the metering housing 20 comprises a first drain opening 62 and a second drain opening 64 located opposite the first drain opening 62, through which the granular solid can be drained out of the metering housing 20, for example in order to empty the metering chamber 28. The drain openings 62, 64 are closed by means of a drain plug 66 in the form of a cap that can be unscrewed. The drain openings 62, 64 are arranged in a separating plane 56 of the metering housing 20 designed in multiple parts. The metering housing 20 is embodied as a two-part housing and comprises a first sub-body 58 and a second sub-body 60. The sub-bodies 58 and 60 have the same, in particular identical, shape as a result of which the production costs can be lowered. Through the arrangement of the drain opening 62, 64 in the separating plane 56, these can be cost-effectively formed without expensive moulds with an external thread for receiving a drain plug 66. At the same time, the sub-bodies 58, 60 can be locked against relative movement on their separating plane 56 by the drain plugs 66.

Within the metering housing 20, a conveyor device 32 that can be rotated about a rotary axis 30 is arranged between the at least one inflow opening 24 and the at least one discharge opening 26 on the bottom side of the metering chamber 28. The conveyor device 32 comprises a number of conveyor elements 78 in the form of cellular wheels, which are arranged in the axial direction along the rotary axis 30 adjacent to one another. Upon a rotation of a conveyor device 32, granular solid is conveyed out of the metering chamber 28 through the at least one discharge opening 26 into the conveyor system 18. Metering of the granular solid takes place as a function of the mounted conveyor elements 78 and the rotational speed of the conveyor device 32. Here, the conveyor elements 78 can be configured identically or differently or be offset from one another in the pitch angle. Furthermore, the metering will be influenced by the quantity of granular solid supplied to the conveyor device 32. For this purpose, the conveyor device 32 comprises at least one first rotary slide valve 34 with at least one first opening 36 for controlling the inflow of the granular solid into the conveyor device 32. Also conceivable is a control of the discharge of the granular solid from the conveyor device 32. The first rotary slide valve 34 can be adjusted by means of an actuator 80, motorically or, as shown, by means of a manually actuatable lever.

The conveyor device 32 is motorically driven by means of, for example, an electric drive motor 66, which rotates about a rotation axis 70. The rotation axis 70 of the drive motor 68 is arranged coaxially to the rotary axis 30 of the conveyor device 32, as a result of which an efficient drive of the conveyor device 32 free of lateral forces is made possible. On the side of the metering housing 20 located opposite the drive motor 68, a drive for the agitator shaft 74 is arranged, which is rotatably mounted about an agitation axis 76 in the metering housing 20. By way of a connecting element 72, the agitation axis 76 is operatively connected to the rotary axis 30, as a result of which upon a rotary movement of the rotary axis 30 a rotary movement of the agitation axis 76 takes place. The term axis is likewise used to describe the respective shaft as mechanical component. The connecting element 72 can be configured in the form of one or multiple gearwheels or, as shown in FIG. 2, in the form of a belt drive. By way of the connecting element 72, a transmission ratio between the rotary speeds of the rotary axis 30 and the agitation axis 76 can be additionally established.

The conveyor elements 78 of the conveyor device 32 can be axially slid onto the rotary axis 30, in particular into the first rotary slide valve 34. Interlocking the conveyor device 32 with the metering device 20 or a rotary slide valve 34 can take place by means of a bayonet closure, which is attached or moulded onto the metering housing 20 on the outside. In the case of a bayonet closure, at least one, preferentially multiple, radially projecting positive locking elements are positioned axially relative to one another on the respective components to be connected each other and secured against disconnection by twisting against each other.

Figure 3:
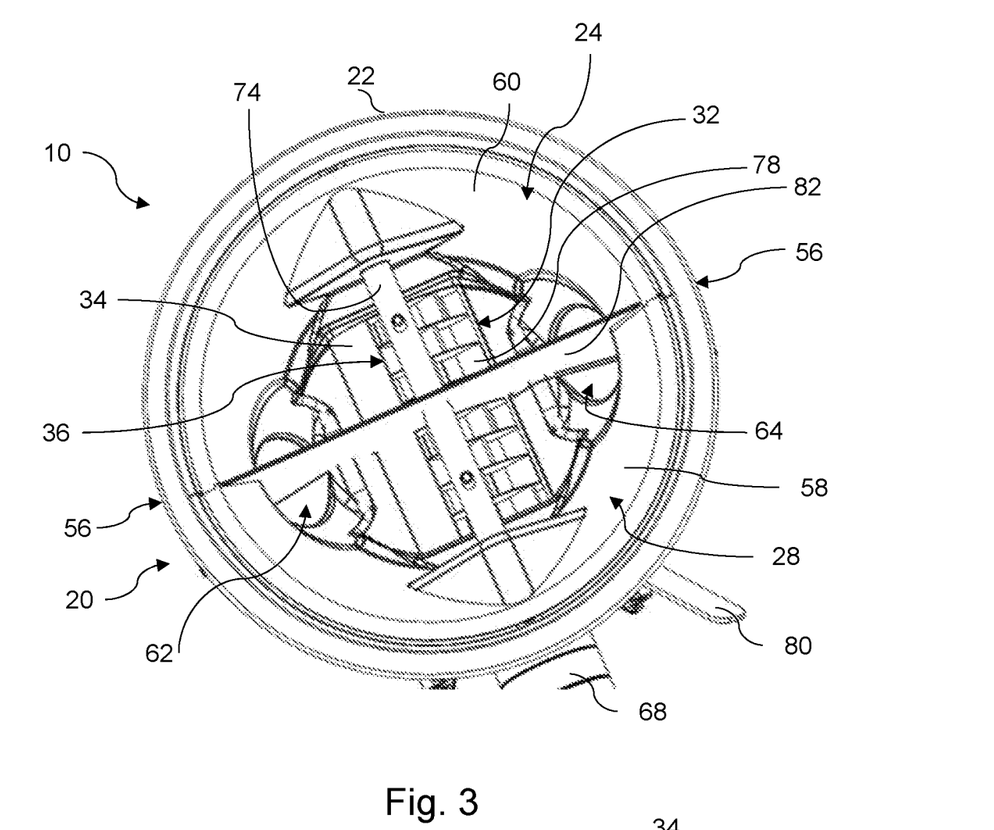
FIG. 3 shows a schematic plan view of a metering device with a separating element.

A schematic plan view of a metering device 10 having a separating element 82 arranged within the metering chamber is shown in FIG. 3. Between the first sub-body 58 and the second sub-body 60, the two-part metering housing 20 comprises the separating plane 56. In the separating plane 56, the separating element 82 is arranged within the metering chamber 28, which separating plane 82 separates the metering chambering 28 substantially into two-part chambers of identical size. This makes possible metering a different granular solid in each part chamber, for example through a respective separate inflow opening 24. Here, the separating element 82 can separate the inflow opening 24 into two inflow openings. Because of the arrangement and configuration of the first and second drain opening 62, 64 in the separating plane 56, the drain openings 62, 64 are likewise separated by the separating element 82, so that a separate drain of the granular solid out of the part chambers is possible. The agitating shaft 74 penetrates the separating element 82 so that the solid can be loosened up on both sides of the separating element 82. By way of a suitable configuration of the first opening 36 of the first rotary slide valve 36, a separate or joint metering of the granular solid out of the part chambers is possible.

Figure 4:
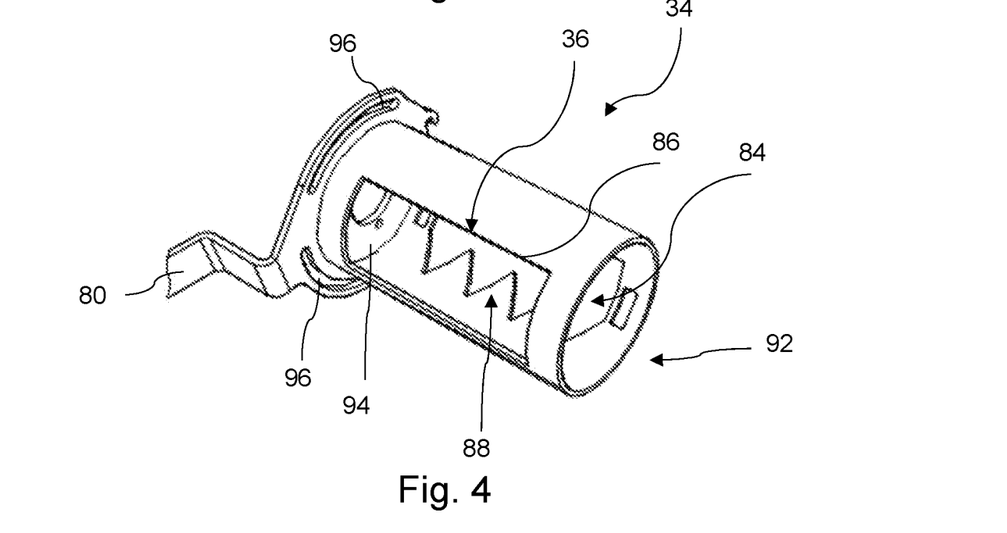
FIG. 4 shows a perspective schematic representation of a first rotary slide valve.

The first rotary slide valve is shown in detail in FIG. 4. The rotary slide valve 34 is substantially designed in the form of a pipe portion having a first opening 36 cut out of the lateral surface. Upon a rotation of the rotary slide valve 34, a cross-section of an opening of the metering chamber on the conveyor device-side can be enlarged or reduced by the lateral surface of the rotary slide valve, in particular with the at least one first opening 36, as a result of which a supply of granular solid into the conveyor device can be controlled. The first opening 36 comprises in the axial direction two rotary axis-parallel edges 86, as a result of which a substantially unhindered inflow of granular solid into the conveyor device can be brought about. In the lateral surface of the first rotary slide valve 34, a second opening 84 located opposite the first opening 36 is arranged. The second opening 84 in a mounted state of the rotary slide valve 34 is assigned to at least one discharge opening. Along the rotary axis, the second opening 84 comprises at least one profiled edge 88, wherein profiling is designed in jagged form. By way of this profiled edge 88, a pulsating dispensation of metered granular solid can be avoided on the discharge side.

Figure 5:
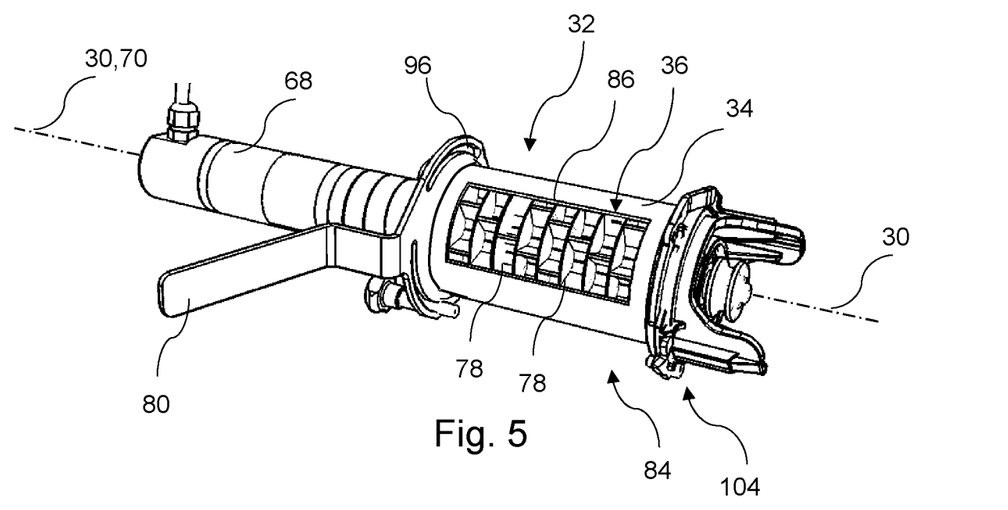
FIG. 5 shows a perspective schematic representation of the conveyor device.

For receiving conveyor elements, the first rotary slide valve 34 comprises a receiving opening 92. Located opposite the receiving opening 92, the first rotary slide valve 34 is at least partially closed by a front wall 94 which also serves as stop for the received conveyor elements. The front wall 94 extends in the radial direction beyond the circumference of the rotary slide valve 34 (FIG. 5) and comprises on the outside a manually actuatable actuator 80 for adjusting the first rotary slide valve 34. Radially on the outside, slots and further openings running in the circumferential direction are additionally arranged, which serve for the fastening of the drive motor 68 to the first rotary slide valve 34 and/or the fastening and rotary fixing of the rotary slide valve 34 to the metering housing 20 (FIG. 2). Here, the drive motor 68 is arranged with its rotation axis 70 coaxially to the rotary axis 30 of the conveyor device 32. The conveyor elements 78 are arranged within the first rotary slide valve 34 as in a cassette and are held on the side of the receiving opening 92 by a partly U-shaped cover which as bayonet closure can be connected to the metering housing 20 and be locked by a rotary movement about the rotary axis 30.

Figure 6:
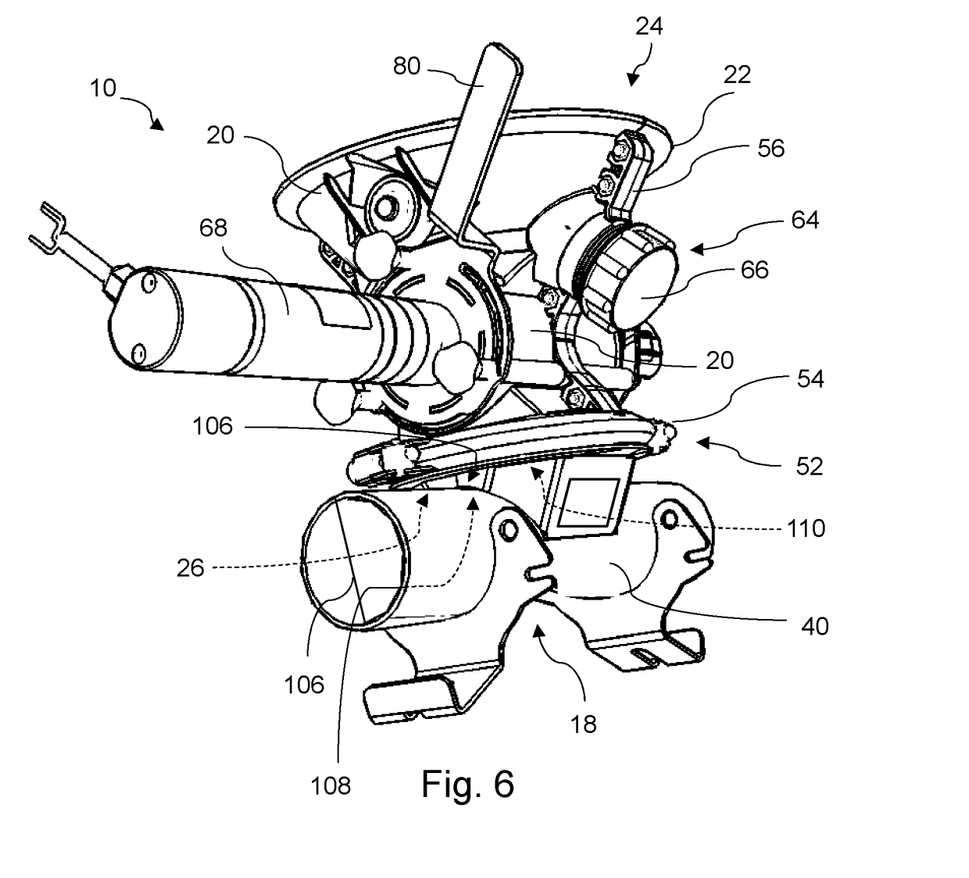
FIG. 6 shows a perspective lateral view of a metering device with a separating device.

The metering device 10 shown in FIG. 6 comprises a separating device 106 on the conveyor system-side, which separates the first discharge opening 26 from a second discharge opening 108 of the metering housing 20. This makes possible on the conveyor system-side a targeted metering of a granular solid into the first and/or second discharge opening 26, 108. The separating device 106 extends from the conveyor device 32 as far as into the conveyor system 18 and into the connecting line 40, as a result of which the connecting line 40 is divided by the separating device 106 on the inside and a part is assigned to each discharge opening 26, 108. Furthermore, the metering device 10 comprises a bypass opening 110 in the metering housing 20, which bypass opening 110 is arranged on a side of the conveyor device 32 located opposite the metering chamber 28. The bypass opening is arranged in the metering housing 20 next to the discharge openings 26, 108 and makes possible conveying granular solid out of the metering device 28 by the conveyor device 32, for example into the surroundings in order to perform a calibration test, or empty the metering chamber 28.

Figure 7:
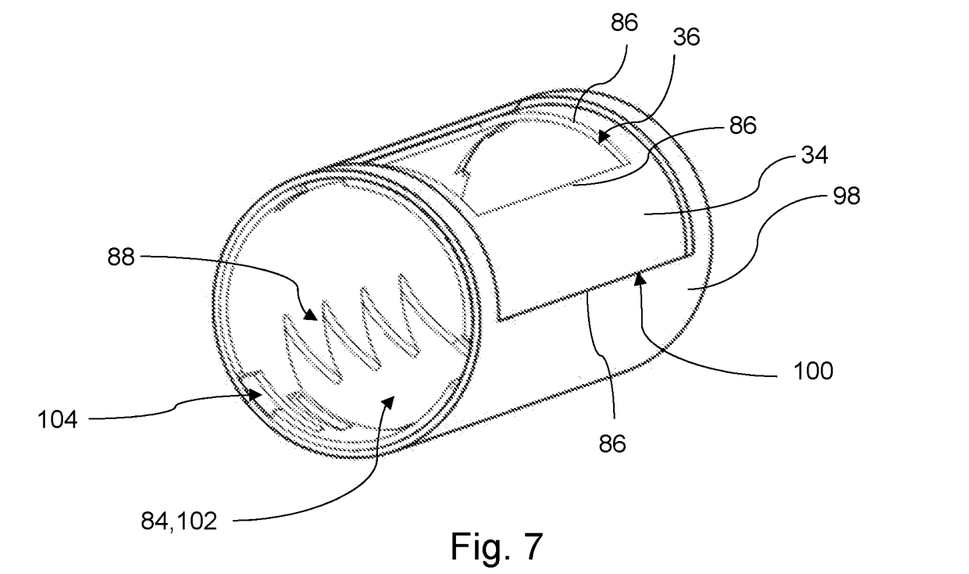
FIG. 7 shows a perspective representation of the first rotary slide valve, which is arranged coaxially within a second rotary slide valve.

Switching the first discharge opening 26, the second discharge opening 108 and/or the bypass opening 110, can take place by means of a further, for example a second rotary slide valve 98, which is shown in FIG. 7. The second rotary slide valve 98 is arranged coaxially and radially adjacently relative to the first rotary slide valve 34, in particular in a contacting manner. Here, the first rotary slide valve 34 is arranged within the second rotary slide valve 98. The first rotary slide valve 34 comprises the first opening 36 with at least one rotary axis-parallel edge 86 for controlling the supplied quantity of granular solid into the conveyor device 32. The shock-free dispensation of the metered solid into the at least one discharge opening (not shown) takes place by way of the second opening 84 with a profiled edge 88. Controlling whether the metered granular solid is dispenses into the first discharge opening, the second discharge opening and/or the bypass opening is effected, for example via the second rotary slide valve 98. For this purpose, the second rotary slide valve 98 has a third opening 100 on the inflow side, which makes possible an unhindered inflow of the solid substantially regardless of the rotary position. Located opposite the third opening 100, a fourth opening 102 is formed in the lateral surface of the second rotary slide valve 98. The fourth opening 102 can likewise comprise rotary axis-parallel edges (not shown) and serves for controlling the dispensation of the metered solid into the respectively selected opening. The third opening 100 has a larger cross-section than the fourth opening 102, since through the third opening 100, in each position of the fourth opening 102, the unhindered inflow of granular solid into the conveyor device is to be ensured.

Figure 8:
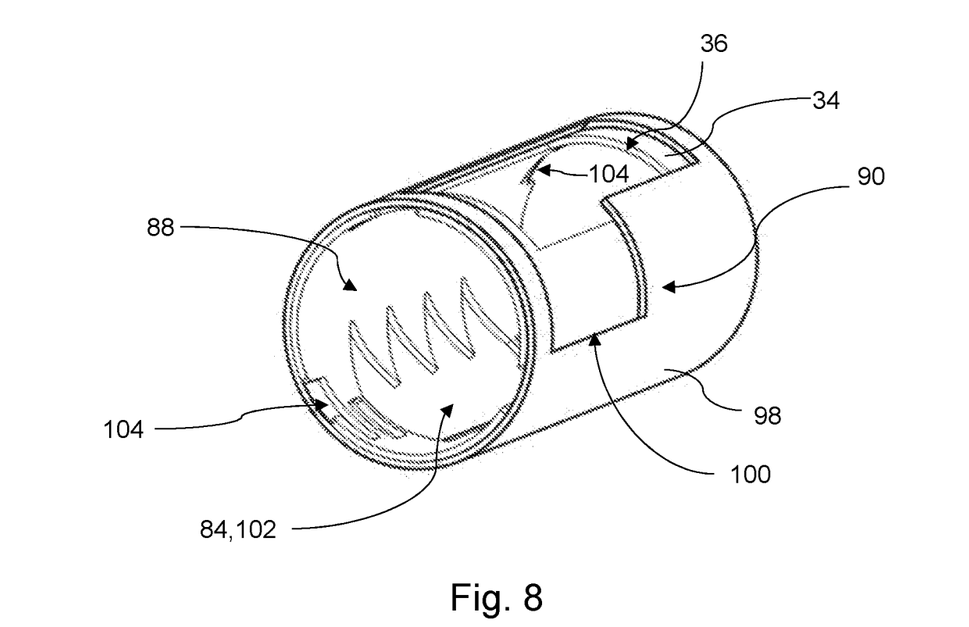
FIG. 8 shows a perspective schematic view of the second rotary slide valve with an alternatively configured edge.

An alternatively configured form of the second rotary slide valve 98 is shown in FIG. 8. The third opening 100 of the second rotary slide valve 98 on the inflow side has a step-shaped edge 90 along the rotary axis. By way of this, the lateral surface of the second rotary slide valve 98 viewed in the axial direction is cut out to different extents. This makes possible, for example in the case of a metering chamber divided by a separating element 82 (FIG. 3) a simultaneous or optional supply of granular solid from the respective part chambers into the conveyor device. The quantity of granular solid supplied into the conveyor device can, furthermore, be controlled by the first rotary slide valve 34 and its first opening 36.

A further rotary slide valve can be provided spaced apart coaxially and in the radial direction from the first and/or second rotary slide valve 34, 98 within the metering housing 20. This further rotary slide valve can be a tubular configuration, wherein for example only a part of its lateral surface can be formed and/or arranged within the metering housing 20, in particular the metering chamber 28. A further rotary slide valve can be arranged with a portion of its lateral surface between the conveyor device 32 and the at least one agitator shaft 74. By way of this, the further rotary slide valve can reduce a pressure of the granular solid on the conveyor device 32, as a result of which clogging in the metering chamber 28 can be avoided and supplying the granular solid to the conveyor device 32 improved.

As used in this application, the term "or" is intended to mean an inclusive "or" rather than an exclusive "or". That is, "A or B" refers to any of "A alone," "B alone," and "both A and B" unless specified otherwise or clear from context. The articles "a" and "an" as used in this application should generally be construed to mean "one or more" unless specified otherwise or clear from context to be directed to a singular form.

| REFERENCE NUMBERS | |
|---|---|
| 10 | Metering device |
| 12 | Agricultural machine |
| 14 | Storage container |
| 16 | Dispensing unit |
| 18 | Conveyor system |
| 20 | Metering housing |
| 22 | First mounting flange |
| 24 | Inflow opening |
| 26 | Discharge opening |
| 28 | Metering chamber |
| 30 | Rotary axis |
| 32 | Conveyor device |
| 34 | First rotary slide valve |
| 36 | First opening |
| 38 | Blower |
| 40 | Connecting line |
| 42 | Conveyor device |
| 44 | Distributor device |
| 46 | Distribution chamber |
| 48 | Distribution opening |
| 50 | Line |
| 52 | Second mounting flange |
| 54 | Fastening means |
| 56 | Separating plane |
| 58 | First sub-body |
| 60 | Second sub-body |
| 62 | First drain opening |
| 64 | Second drain opening |
| 66 | Drain plug |
| 68 | Drive motor |
| 70 | Rotation axis |
| 72 | Connecting element |
| 74 | Agitator shaft |
| 76 | Agitation axis |
| 78 | Conveyor element |
| 80 | Actuator |
| 82 | Separating element |
| 84 | Second opening |
| 86 | Rotary axis-parallel edge |
| 88 | Profiled edge |
| 90 | Step-shaped edge |
| 92 | Receiving opening |
| 94 | Front wall |
| 96 | Slot |
| 98 | Second rotary slide valve |
| 100 | Third opening |
| 102 | Fourth opening |
| 104 | Bayonet closure |
| 106 | Separating device |
| 108 | Second discharge opening |
| 110 | Bypass opening |
| 112 | Sensor |
| 114 | Electronic evaluation system |

The invention claimed is:

1. A metering device (10) for an agricultural machine (12) for outputting granular solids from a storage container (14) through a conveyor system (18) to a dispensing unit (16), comprising:

a metering housing (20), wherein the metering housing (20) comprises
- a first mounting flange (22, 52) on a storage container side or on a conveyor system side,
- an inflow opening (24) for the granular solids, and
- a discharge opening (26, 108) for the granular solids, wherein the first mounting flange (22, 52) is formed as a polygon or circular, wherein a metering chamber (28) is formed inside the metering housing (20), wherein a conveyor device (32) rotating about a rotary axis (30) is arranged between the metering chamber (28) and the conveyor system (18), wherein the conveyor device (32) separates the inflow opening (24) and the discharge opening (26) in a pressure-tight manner, wherein the metering housing (20) is formed out of two substantially mirrored or identically shaped sub-bodies (58, 60), wherein a separating plane (56) of the sub-bodies (58, 60) of the metering housing (20) is substantially arranged at an angle to the rotary axis (30), and wherein the metering housing (20) comprises a drain opening (62) which is arranged in the separating plane (56) of the sub-bodies (58, 60) of the metering housing (20).

2. The metering device according to claim 1,
wherein the conveyor system is a pneumatic conveyor system.

3. The metering device according to claim 1,
wherein the inflow opening (24) or the discharge opening (26, 108) is arranged within the first mounting flange (22, 52).

4. The metering device according to claim 1, further comprising a second mounting flange (52) located opposite the first mounting flange (22),
wherein the second mounting flange (52) is formed as a polygon or circular.

5. The metering device according to claim 1,
wherein the first mounting flange (22, 52) is formed to be mounted by a fastening means (54) which wraps around the first mounting flange (22, 52).

6. The metering device according to claim 5,
wherein the fastening means (54) is a quick release closure.

7. The metering device according to claim 1,
wherein the metering housing (20) is formed in multiple parts.

8. A metering device (10) for an agricultural machine (12) for outputting granular solids from a storage container (14) through a conveyor system (18) to a dispensing unit (16), comprising
a metering housing (20), wherein the metering housing (20) comprises
- a first mounting flange (22, 52) on a storage container side or on a conveyor system side,
- an inflow opening (24) for the granular solids, and
- a discharge opening (26, 108) for the granular solids, wherein the first mounting flange (22, 52) is formed as a polygon or circular, wherein the metering housing (20) forms a metering chamber (28), and wherein a detachable separating element (82) is arranged within the metering chamber (28).

9. The metering device according to claim 1,
wherein the metering housing (20) comprises a further discharge opening (108) or a bypass opening (110) on the conveyor system side of the conveyor device (32).

10. The metering device according to claim 1,
wherein a separating device (106) is provided on the conveyor system side of the conveyor device (32).

11. The metering device according to claim 8,
wherein a driveable agitator shaft (74) is arranged within the metering chamber (28) on the storage container side.

12. An agricultural machine for outputting granular solids, comprising:
- the metering device (10) according to claim 1;
- the storage container (14);
- the conveyor system (18); and
- the dispensing unit (16), wherein the conveyor system (18) is a pneumatic conveyor system (18) for conveying the granular solids from the storage container (14) after exiting the metering device (10) to the dispensing unit (16).

13. The agricultural machine according to claim 12,
wherein the metering device (10) is assigned one or multiple dispensing units (16) or distribution devices (44).

* * * * *